Patented May 4, 1937

2,078,996

UNITED STATES PATENT OFFICE 2,078,996

NEW DYESTUFFS OF THE ANTHRAQUINONE SERIES

Wilhelm Bauer, Leverkusen-Wiesdorf, Germany, assignor to General Aniline Works, Inc., New York, N. Y., a corporation of Delaware No Drawing. Application January 14, 1935, Serial No. 1,819. In Germany January 13, 1934

9 Claims. (Cl. 260—37)

(Granted under the provisions of sec. 14, act of March 2, 1927; 357 O. G. 5)

The present invention relates to new dyestuffs of the anthraquinone series and to a process of preparing same.

The starting materials made use of in my present invention are anthraquinone-2.1-(N)-benzene- or naphthalene acridones, i. e. compounds of the following nuclear structure:—

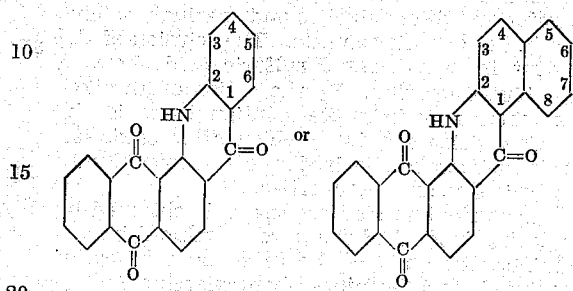

The said compounds are characterized by the presence of an 1-amino-4-, -5- or -8-aroylamino-anthraquinone residue in the benzene or naphthalene nucleus and, furthermore, by the fact that in the benzene or naphthalene nucleus one ortho-position to the 1-aminoaroylaminoanthraquinone residue and in the latter the ortho-position to the amino group is unsubstituted. My initial materials can be prepared by various methods, a preferred form being to condense in a suitable organic solvent and in the presence of a copper salt and an inorganic base 1-amino-4-, -5- or -8-aroylaminoanthraquinones with anthraquinone-2.1-(N)-benzene or naphthalene acridones which contain movable halogen atoms in the benzene or nathalene nucleus, particularly in the benzene-6'-or in the naphthalene-4'- or 6'-position. The products thus obtainable are dyestuffs by themselves and dye vegetable fibers from the vat brown-red, violet, greyish, blue or green shades depending on the nature of the indifferent substituents contained in the nuclei, particularly in the benzene- or naphthalene-nucleus. As substituents of the character described there may be mentioned, for instance, alkyl-, alkoxy-, aryloxy groups and halogen atoms. The dyeings and prints obtainable from the said dyestuffs show, besides a relatively good fastness to washing, an insufficient fastness to chlorine.

The said products will for brevity's sake be hereafter defined by the following formula:—

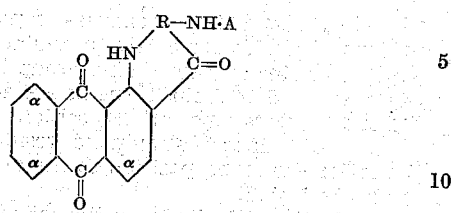

wherein R stands for a benzene- or naphthalene nucleus, A stands for a 1-anthraquinone residue which contains an aroylamino group in one of the α-positions and wherein in the benzene- or naphthalene nucleus one ortho-position to the 1-aminoaroylaminoanthraquinone residue and in the latter the ortho-position to the amino-group is unsubstituted.

It is the object of this invention to prepare new vat dyestuffs possessing valuable dyeing characteristics by causing substantially anhydrous acid condensing agents to react upon the said initial products. Other and further objects of this invention will become more apparent as the description proceeds.

As condensing agents which serve the purpose in question there may be mentioned sulfuric acid monohydrate, sulfuric acid with a small content of free sulfur trioxide, chlorosulfonic acid, aluminium chloride, sulfuric acid of 66° Bé. and the like. The employment of aluminium chloride as condensing agent requires working in the melt, it being preferable to subject the reaction product to an aftertreatment with chlorine water. In case sulfuric acid or chlorosulfonic acid are employed as condensing agents the reaction starts at ordinary temperature with the formation of intermediate products which are characterized by a higher hydrogen content than the final products; they probably belong to the type of "stable leuco compounds". These intermediate products, either in solution or after isolation can be converted into the final reaction products by subjecting them to the action of oxidizing agents such as sodium nitrite, chlorine water, halogens, ferric chloride or manganese dioxide. Working with the last mentioned condensing agents at elevated temperature such as 30-80° C. from the very beginning effects that the intermediate product is oxidized in one stage of reaction, part of the sulfuric acid or chlorosulfonic acid being reduced to sulfur dioxide.

I wish to point out that my invention is not restricted to any particular procedure or to the presence of any particular substituent contained in the starting materials, it being understood that the nature and the position of the substituent are immaterial for the course of the reaction, provided that in the benzene- or naphthalene nucleus one ortho-position to the 1-aminoaroylaminoanthraquinone residue and in the latter the ortho-position to the amino group is unsubstituted.

The novel compounds which are obtainable in accordance with my present invention correspond to the type of carbazoles which are derived from compounds of the following formula:—

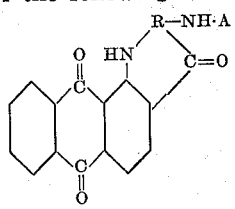

wherein R stands for a benzene- or naphthalene nucleus, A stands for a 1-anthraquinone residue which contains an aroylamino group in 4-, 5- or 8-position and wherein in the benzene- or naphthalene nucleus one ortho-position to the 1-aminoaroylaminoanthraquinone residue and in the latter the ortho-position to the amino group is unsubstituted.

For clarity's sake I give in the following a general formula of the compounds which are obtained in case anthraquinone-2.1-(N)-benzene acridones, to which the aminoanthraquinone residue is attached in Bz-6'-position, are employed as initial products:—

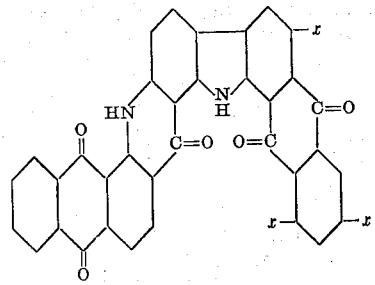

In the above formula one x stands for an aroylamino group whereas the other positions in the anthraquinone- and benzene nuclei may contain various substituents. The new dyestuffs generally represent dark powders which are insoluble in water, alcohol, alkalies and diluted mineral acids and soluble in concentrated sulfuric acid with a vivid blue, green-blue or red coloration. They are easily soluble in the alkaline hydrosulfite vat and dye from the vat vegetable fibers dark shades of an excellent yield and very good fastness properties. Furthermore, they can be employed for printing purposes with or without previous reduction.

Without limiting my invention to any particular procedure or to any particular compound the following examples are given to illustrate my preferred mode of operation, the parts being by weight:—

*Example 1*

39.4 parts of anthraquinone-2.1-(N)-1'.2'-(N).3'.6'-dichlorobenzene acridone obtainable from 2.5-dichloroaniline according to the process described in U. S. Patent No. 1,002,066.

| | Parts |
|---|---|
| 1-amino-5-benzoylaminoanthraquinone | 35.0 |
| Finely powdered anhydrous potassium carbonate | 8.0 |
| Copper acetate | 1.0 |
| Nitrobenzene | 500.0 | are heated to 205° C. for three hours while stirring and refluxing. The dyestuff formed crystallizes from the mixture and after cooling it is isolated by suction, washed with organic solvents in order to remove the mother liquor and washed with warm dilute hydrochloric acid in order to remove the inorganic salts, then washed with water and dried. It forms a black crystalline powder, which is difficultly soluble even in hot organic solvents. It is soluble in concentrated sulfuric acid with a brown coloration. From the hydrosulfite vat, which exhibits a dark red violet coloration, it dyes vegetable fibres reddish-grey shades of good fastness to washing.

50 parts of the above mentioned dyestuff are dissolved in 350 parts of chlorosulfonic acid, heated to 50° C., the solution being maintained at this temperature for about half an hour. A deep blue solution is obtained, sulfur dioxide being evolved. After cooling, the solution is poured onto ice, the brown precipitate filtered with suction, washed and dried. The product thus obtained forms a dark powder, which is insoluble in water and dilute alkalies and sparingly soluble even in hot organic solvents. The solution of the product in concentrated sulfuric acid shows a clear blue coloration. By the action of an alkaline reacting hydrosulfite solution there is obtained a violet vat, from which after oxidation vegetable fibers can be dyed reddish-brown shades of excellent fastness properties.

A product of similar properties is obtained by employing instead of the pure 1-amino-5-benzoylaminoanthraquinone the technical mixture of 1-amino-5- and 1-amino-8-benzoylaminoanthraquinone.

*Example 2*

If anthraquinone-2.1-(N)-1'.2'-(N)-3'.6'-dichlorobenzene acridone which has been used according to Example 1, is replaced by an equal amount of anthraquinone-2.1-(N)-1'.2'-(N)-4'.6'-dichlorobenzene acridone obtainable in the same manner as described above from 3.5-dichloroaniline, there is obtained as intermediate product an anthrimide, which separates in the form of dark needles and exhibits similar properties to the intermediate product described in Example 1. It dyes vegetable fibers from a reddish vat red shades.

By heating the said intermediate product with ten times the quantity of sulfuric acid monohydrate to 70–80° C. for about half an hour there is obtained a dark blue coloration with an evolution of sulfur dioxide. On pouring the solution into water, the dyestuff separates; it dyes vegetable fibers from a ruby red vat yellowish brown shades of excellent fastness properties.

*Example 3*

| | Parts |
|---|---|
| Anthraquinone-2.1-(N)-1'.2'-(N)-4'.6'-dichlorobenzene acridone | 39.4 |
| 1-amino-4-benzoylaminoanthraquinone | 35.0 |
| Finely powdered dry potassium carbonate | 8.0 |
| Copper acetate | 1.0 |
| Nitrobenzene | 500.0 | are heated to 205° C., for 3 hours while stirring. The dyestuff formed separates in the form of black needles and is isolated in the usual manner. It dyes cotton navy blue shades from the hydrosulfite vat.

The said product is dissolved in ten times the quantity of sulfuric acid monohydrate and heated to 75° C. for half an hour, whereby a red solution is obtained with evolution of sulfur dioxide. The dyestuff is isolated therefrom by pouring it into water and is a dark powder insoluble in organic solvents and in water. The solution in sulfuric acid shows a red coloration. The dyestuff after oxidation dyes vegetable fibers vivid brownish-red shades from a red vat. The shades show excellent fastness properties.

A dyestuff of similar properties is obtained by the employment of 1-amino-4-(para-chloro)-benzoylaminoanthraquinone instead of the 1-amino-4-benzoylaminoanthraquinone.

*Example 4*

39 parts of anthraquinone-2.1-(N)-1'.2'-(N)-3'-methoxy- or -ethoxy-6'-chlorobenzene acridone (obtainable by causing 2-methoxy- or -ethoxy-5-chloroaniline to react with 1-chloroanthraquinone-2-carboxylic acid in the manner described in Example 1 and heating the 2'-methoxy- or -ethoxy-5'-chloro-1-anilidoanthraquinone-2-carboxylic acid thus obtained with benzoyl chloride to 130–160° C. for about 1½ hours),

| | Parts |
|---|---|
| 1-amino-5-benzoylaminoanthraquinone | 35 |
| Powdered anhydrous potassium carbonate | 8 |
| Copper acetate | 1 |
| Naphthalene | 500 | are heated to boiling for about 3 hours. The mixture is then diluted with 1000 parts of chlorobenzene and the precipitate formed is filtered with suction at a temperature of about 50° C. The dyestuff forms a dark greenish crystalline powder, which is soluble in concentrated sulfuric acid to form olive green solutions and dyes vegetable fibers olive green shades from a red violet vat.

By heating the intermediate product thus formed for about half an hour with ten times the amount of sulfuric acid monohydrate to 70° C., there is obtained a dark blue solution, from which the dyestuff precipitates on pouring the same into water. It is isolated in the usual manner and dried. It forms an almost black powder, which is insoluble in water and organic solvents and easily soluble in concentrated sulfuric acid to form clear blue solutions, and dyes cotton fast black-brown shades from a red brown vat.

A similar dyestuff is obtained by dissolving the above described intermediate product in ten times the quantity of sulfuric acid monohydrate in the cold, pouring the dark brown solution thus obtained, after about 3 hours standing, into water, filtering with suction the precipitate obtained, making into a paste with the addition of water and sodium hydroxide in small excess, stirring the same with an excess of a sodium hypochlorite solution for about 2 hours, filtering with suction, washing and drying.

The dyestuff thus obtained dissolves in sulfuric acid with a blue coloration and dyes cotton fast black-brown shades from the hydrosulfite vat.

*Example 5*

If in the preceding example 1-amino-5-benzoylaminoanthraquinone is replaced by the same amount of 1-amino-4-benzoylaminoanthraquinone, there is obtained an anthrimide in the form of black needles, which dyes cotton from a violet vat clear yellowish green shades of excellent fastness to boiling. By dissolving this product in fifteen times the quantity of sulfuric acid monohydrate, there is obtained, after 15 hours' standing at ordinary temperature in the absence of moisture, an olive brown solution. Nitrosylsulfuric acid is added thereto drop by drop until the solution has assumed a vivid red coloration, which does not undergo further change. This solution is poured into ice water, whereby the dyestuff after isolation separates in the form of a brownish violet precipitate. It is soluble in sulfuric acid with a vivid red coloration and dyes cotton after oxidation reddish-violet shades of excellent fastness to chlorine and to boiling, from a vat having a red coloration.

*Example 6*

22.5 parts of 3'-methyl-6'-chloro-2.1'-anthraquinone acridone (obtainable by causing 4-chloro-2-toluidine to react upon 1-chloroanthraquinone-2-carboxylic acid and heating the product thus obtained with benzoyl chloride to 150° C. for 1 hour),

| | Parts |
|---|---|
| 1-amino-5-benzoylaminoanthraquinone | 20.4 |
| Potassium carbonate | 5.4 |
| Copper acetate | 0.3 |
| Nitrobenzene | 400.0 | are heated to boiling for about 3 hours. After cooling, the dark brown precipitate is filtered with suction and boiled with pyridine for purification. The product dissolves in sulfuric acid with a yellowish brown coloration and dyes vegetable fibers greyish shades from a violet red vat.

32 parts of the condensation product thus obtained are dissolved in 400 parts of sulfuric acid monohydrate and stirred for half an hour at 60° C. The blue solution thus obtained is poured into ice water while stirring, the brown precipitate filtered with suction, washed with water and dried. It dyes cotton dark brown shades from a blue red vat and dissolves in sulfuric acid with a blue coloration.

*Example 7*

If, in the above example, 1-amino-5-benzoylamino-anthraquinone is replaced by an equal amount of 1-amino-4-benzoylaminoanthraquinone, there is obtained an anthrimide which dissolves in sulfuric acid with a yellowish brown coloration and dyes vegetable fibers greenish shades from a violet vat.

By treating the above mentioned condensation product with sulfuric acid monohydrate at 60–70° C. for half an hour, there is obtained a dyestuff which dyes cotton violet brown shades from a red vat and dissolves in concentrated sulfuric acid with a red coloration.

*Example 8*

49 parts of anthraquinone-2.1-(N)-1'.2'-(N)-6'-bromo-naphthalene acridone (obtainable in the form of red needles from 1-chloroanthraquinone-2-carboxylic acid and 6-bromo-2-naphthylamine according to the process described in U. S. Patent 1,002,066),

| | Parts |
|---|---|
| 1-amino-5-benzoylaminoanthraquinone | 35 |
| Finely powdered anhydrous potassium carbonate | 8 |
| Copper acetate | 1 |
| Nitrobenzene | 500 | are heated to 205° C. for 2 hours while stirring. The dyestuff formed separates in the form of black needles and dyes cotton dark red shades from a wine-red vat.

If the intermediate product thus obtained is dissolved in ten times the amount of sulfuric acid monohydrate and the yellowish brown solution is heated to 70° C. for half an hour, the solution becomes bluish-green. The solution is poured into water, whereby a brown precipitate separates. The dyestuff is a dark powder which is insoluble in organic solvents and soluble in sulfuric acid with a blue green coloration. It dyes cotton yellowish brown shades of excellent fastness properties from a red violet vat. If, instead of 1-amino-5-benzoylaminoanthraquinone an equal amount of 1-amino-4-benzoylaminoanthraquinone is employed, there is obtained an anthrimide in the form of olive colored needles, which dye cotton olive shades. By the action of sulfuric acid monohydrate there is obtained a product which is soluble in sulfuric acid with a green coloration and dyes cotton from the vat black-brown shades.

Example 9

20 parts of anthraquinone-2.1-(N)-1'.2'-(N)-3'-ethoxy-6'-chloroacridone (obtainable from 2-ethoxy-5-chloraniline and 1-chloroanthraquinone-2-carboxylic acid and heating the condensation product obtained therefrom with an equal amount of benzoyl chloride in the presence of ortho-dichlorobenzene at 150° C. for 1½ hours).

|  | Parts |
|---|---|
| 1-amino-5-benzoylaminoanthraquinone | 18 |
| Potassium carbonate | 4 |
| Copper acetate | 1 |
| Nitrobenzene | 400 | are boiled for 2 hours. The dyestuff formed separates after some time and after cooling it is filtered with suction, washed and dried. It dyes olive green shades from a red vat.

20 parts of the product thus obtained are dissolved in 250 parts of sulfuric acid monohydrate. After 24 hours standing at ordinary temperature and in the absence of moisture, the brown solution has become dark blue. On pouring into water there is obtained a dark brown precipitate. The dyestuff dissolves in sulfuric acid to a clear blue coloration and dyes cotton fast black-brown shades from a red-brown vat.

Example 10

20 parts of the intermediate product obtained according to Example 1, are dissolved in 200 parts of sulfuric acid monohydrate and heated to 50° C. for 1 hour. To the dark colored solution there are added drop by drop 4.5 parts of bromine while stirring, whereby the solution becomes clear blue. After half an hour's stirring at 40° C. the solution is poured into ice water and the dyestuff is isolated in the usual manner. The properties of the new dyestuff are similar to those described in Example 1.

Example 11

30 parts of the intermediate product obtained according to Example 1 are added to a melt of 300 parts of anhydrous aluminium chloride and 60 parts of dry sodium chloride at 150° C. and the mixture is kept at 180° C. for 1½ hours while stirring. The melt is dissolved in water with the addition of some hydrochloric acid, the dark violet precipitate is filtered with suction, washed with dilute hydrochloric acid and water, finely suspended in 2500 ccs. of water and stirred with 250 parts of a weak solution of sodium hypochlorite at 50° C. for 1 hour. The precipitate is then filtered with suction and washed and dried. The dyestuff dissolves in concentrate sulfuric acid with a blue coloration and dyes cotton after oxidation fast brown shades from a brown red vat. The shades are somewhat duller than those obtainable from the dyestuff prepared according to Example 1.

Example 12

|  | Parts |
|---|---|
| 4'-chloro-2.1-anthraquinone acridone (obtainable according to British specification No. 27,637/10) | 72 |
| 1-amino-5-benzoylaminoanthraquinone | 80 |
| Potassium carbonate | 20 |
| Copper acetate | 5 |
| Nitrobenzene | 2000 | are heated to 200° C. for 2 hours. After half an hour's stirring the condensation product begins to separate. After cooling it is filtered with suction, washed and dried. It forms a red brown crystalline powder, which dissolves in sulfuric acid with a yellowish brown coloration and dyes cotton from the vat copper-red shades.

40 parts of the anthrimide thus obtained are melted as described in Example 11 with 300 parts of aluminium chloride and 60 parts of sodium chloride for 2 hours, the temperature being 150–160° C. The dyestuff is isolated in the usual manner and then finely dispersed in water and purified by stirring with 250 parts of a weak solution of sodium hypochlorite. After isolating the dyestuff forms a dark brown powder, which dissolves in sulfuric acid with a dark green coloration and dyes cotton fast reddish brown shades from a red brown vat.

Example 13

|  | Parts |
|---|---|
| 5'-bromoanthraquinone-2.1-acridone (obtainable from para-bromoaniline as described in U. S. Patent 1,002,066) | 40 |
| 1-amino-5-benzoylaminoanthraquinone | 35 |
| Potassium carbonate | 8 |
| Copper acetate | 1 |
| Nitrobenzene | 500 | are heated to 200° C. for 4 hours while refluxing and stirring. After cooling the dyestuff is isolated in the usual manner. It forms black needles which dye cotton from a brown red vat vivid corinth shades of good fastness to washing and which dissolve in sulfuric acid with a yellowish brown coloration. After heating to 100° C. the solution becomes olive green.

50 parts of the product thus obtained are dissolved with ten times the quantity of sulfuric acid monohydrate and heated to 70° C. for half an hour, whereby the solution assumes a dark blue coloration. On pouring the solution into water the new dyestuff separates in the form of brown flakes. It is isolated in the usual manner and forms a dark brown powder, which dissolves in sulfuric acid with a greenish-blue coloration and dyes cotton from a violet vat fast dark brown shades.

Example 14

50 parts of the anthrimide obtainable from anthraquinone-2.1-(N)-1'.2'-(N)-3'-methoxy-6'-chlorobenzene acridone and 1-amino-5-benzoylaminoanthraquinone according to the method described in Example 4, are dissolved while cooling in 1000 parts of sulfuric acid of 66° Bé. After 2 hours stirring at a temperature of 20°

C., nitrosylsulfuric acid containing 10% of nitrite is dropped in until the solution has assumed a dark blue coloration, which does not change on further addition (approximately 30-35 parts of nitrosylsulfuric acid). Stirring is continued for a short time, then the mass is poured into cold water and the dyestuff isolated as described in Example 4. It is soluble in sulfuric acid with a clear blue coloration and dyes cotton from a reddish-brown hydrosulfite vat fast blackish-brown shades.

I claim:—

1. The process which comprises causing substantially anhydrous acid condensing agent to react upon compounds of the following formula:—

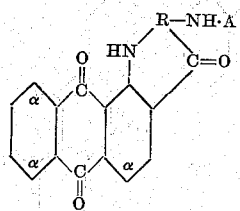

wherein R stands for an aromatic nucleus selected from the group consisting of the benzene and naphthalene nuclei, A stands for a 1-anthraquinone radical which contains a benzoylamino group in one of the α-positions and wherein in R one ortho-position to the 1-aminobenzoylamino anthra-quinone radical and in the latter the ortho-position to the amino group is unsubstituted.

2. The process which comprises melting a compound of the following formula:—

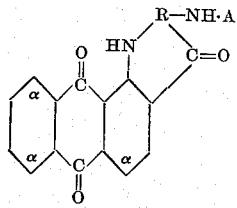

wherein R stands for an aromatic nucleus selected from the group consisting of the benzene and naphthalene nuclei, A stands for 1-anthraquinone radical which contains a benzoylamino group in one of the α-positions and wherein in R one ortho-position to the 1-aminobenzoylamino anthra-quinone radical and in the latter the ortho-position to the amino group is unsubstituted, with aluminium chloride and reacting with oxidizing agent upon the intermediate products thus formed.

3. The process which comprises causing a substantially anhydrous acid condensing agent selected from the group consisting of highly concentrated sulfuric acid and chlorosulfonic acid to react upon a compound of the formula:—

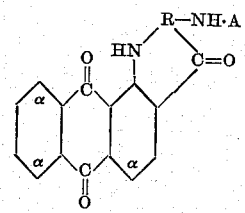

wherein R stands for an aromatic nucleus selected from the group consisting of the benzene and naphthalene nuclei, A stands for a 1-anthraquinone radical which contains a benzoylamino group in one of the α-positions and wherein in R one ortho-position to the 1-aminobenzoyl-amino anthra-quinone radical and in the latter the ortho-position to the amino group is unsubstituted, at ordinary temperature and reacting with oxidizing agents upon the intermediate products thus formed.

4. The process which comprises causing a substantially anhydrous acid condensing agent selected from the group consisting of highly concentrated sulfuric acid and chlorosulfonic acid to react upon a compound of the formula:—

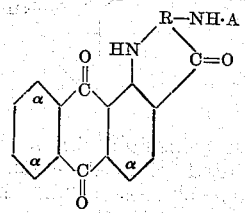

wherein R stands for an aromatic nucleus selected from the group consisting of the benzene and naphthalene nuclei, A stands for a 1-anthraquinone radical which contains a benzoylamino group in one of the α-positions and wherein in R one ortho-position to the 1-aminobenzoyl-amino anthra-quinone radical and in the latter the ortho-position to the amino group is unsubstituted, at a temperature of between about 30° C. and 80° C.

5. Carbazoles of compounds of the following formula:—

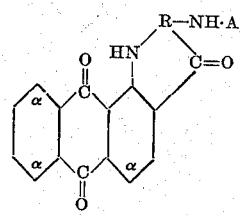

wherein R stands for an aromatic nucleus selected from the group consisting of the benzene and naphthalene nuclei, A stands for a 1-anthraquinone radical which contains a benzoylamino group in one of the α-positions and wherein in R one ortho-position to the 1-aminobenzoyl-amino anthra-quinone radical and in the latter the ortho-position to the amino group is unsubstituted, these compounds being insoluble in water, alcohol, alkalies and diluted mineral acids, sparingly soluble in organic solvents, soluble in concentrated sulfuric acid and easily soluble in the alkaline hydrosulfite vat.

6. The compounds of the formula:

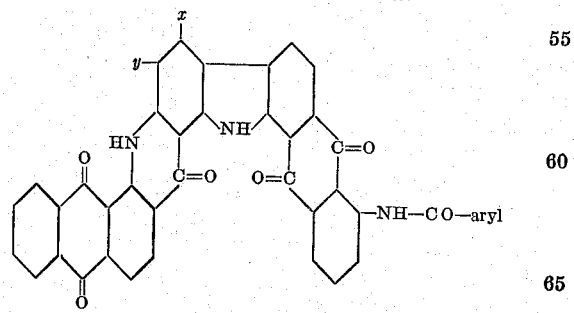

wherein $x$ stands for a monovalent substituent selected from the group consisting of hydrogen and halogen, $y$ stands for a monovalent substituent selected from the group consisting of hydrogen, halogen, alkyl and alkoxy and "aryl" means a radical of the benzene series, these compounds being insoluble in water, alcohol, alkalies and diluted mineral acids, sparingly soluble in organic solvents, soluble in concentrated sulfuric acid with a blue coloration and easily soluble in the alkaline hydrosulfite vat.

7. The product of the formula:—

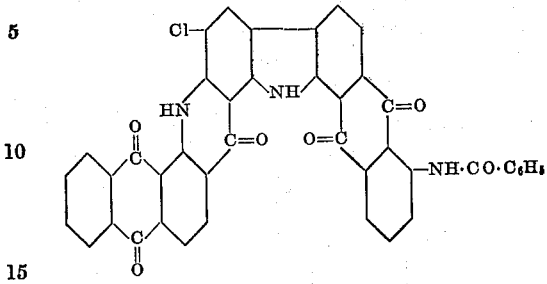

this compound being insoluble in water, alcohol, alkalies, and diluted mineral acids, sparingly soluble in organic solvents, soluble in concentrated sulfuric acid with blue coloration and easily soluble in the alkaline hydrosulfite vat.

8. The product of the formula:—

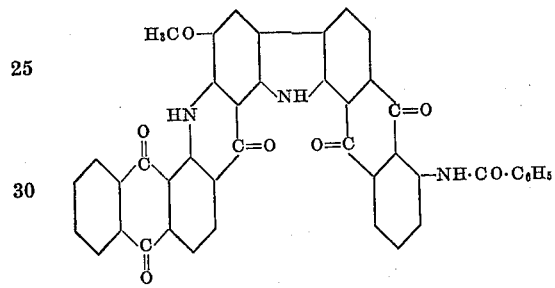

this compound being insoluble in water, alcohol, alkalies and diluted mineral acids, sparingly soluble in organic solvents, soluble in concentrated sulfuric acid with blue coloration and easily soluble in the alkaline hydrosulfite vat.

9. The product of the formula:—

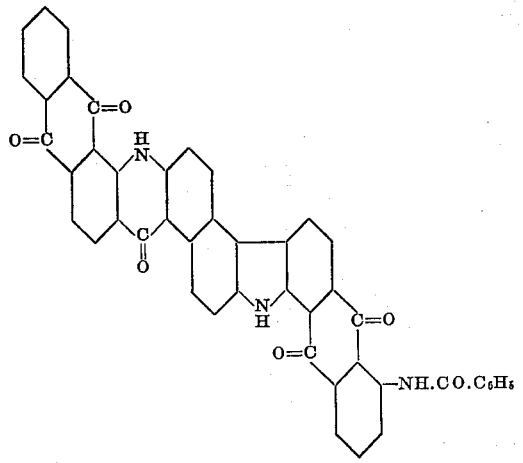

this compound being insoluble in water, alcohol, alkalies and diluted mineral acids, sparingly soluble in organic solvents, soluble in concentrated sulfuric acid with a bluish green coloration and easily soluble in the alkaline hydrosulfite vat.

WILHELM BAUER.